US007825334B2

(12) United States Patent
Chien

(10) Patent No.: US 7,825,334 B2
(45) Date of Patent: Nov. 2, 2010

(54) SOCKET WITH POWER SUPPLY

(76) Inventor: Chao Chuan Chien, 8F, No. 387, Chung Cheng Road, Hsin Chuang City, Taipei Hsien (TW)

( * ) Notice: Subject to any disclaimer, the term of this patent is extended or adjusted under 35 U.S.C. 154(b) by 486 days.

(21) Appl. No.: 11/980,750

(22) Filed: Oct. 31, 2007

(65) Prior Publication Data

US 2009/0161332 A1 Jun. 25, 2009

(51) Int. Cl.
*H02G 3/08* (2006.01)

(52) U.S. Cl. ............................. 174/50; 174/59; 174/53; 242/373; 242/375; 242/376; 242/379; 242/378; 363/142; 363/146; 320/111

(58) Field of Classification Search ................. 242/375; 361/836, 603, 620, 623, 663
See application file for complete search history.

(56) References Cited

U.S. PATENT DOCUMENTS

| | | | | |
|---|---|---|---|---|
| 3,657,491 | A * | 4/1972 | Ryder et al. | 191/12.2 R |
| 6,433,274 | B1 * | 8/2002 | Doss et al. | 174/50 |
| 6,502,777 | B2 * | 1/2003 | Liao | 242/373 |
| 2005/0117376 | A1 * | 6/2005 | Wilson | 363/142 |

* cited by examiner

*Primary Examiner*—Hung S Bui
*Assistant Examiner*—Steven Sawyer
(74) *Attorney, Agent, or Firm*—Guice Patents PLLC

(57) ABSTRACT

The present invention discloses a socket with power supply, comprising a housing having a upper cover and a lower cover which are connected together to form a receiving space; a transformer connected with an alternate current source through a plug protruding out of the first opening; at least a socket capable of outputting the alternate current; a rectifying circuit capable of rectifying the alternate current to direct current; and an output power plug coupled with the rectifying circuit and protruding out of the second opening through a power cord to output the direct current to an electronic device.

7 Claims, 6 Drawing Sheets

SOCKET WITH POWER SUPPLY

FIELD OF THE INVENTION

The present invention relates to a power supply, and more particularly to a power supply that can provides direct current to electronic devices and alternate current to electric devices, respectively.

BACKGROUND OF THE INVENTION

A common extension socket has a plurality of sockets, which provide alternate current to electric devices. Common electronic devices are usually disposed with a direct current adapter to lower the voltage of alternate current and to rectify it to alternate current, which is output to power electronic devices. However, for a direct current adapter, there is only one direct-current output plug for electronic devices. If alternate current is demanded for other electric devices, another extension with sockets is necessary to acquire alternate current. Therefore, it is not only inconvenient for users, but also hard to keep power cords organized.

Consequently, it is necessary to design a novel socket with power supply to overcome the drawbacks described above.

SUMMARY OF THE INVENTION

In view of the foregoing shortcomings of the prior art, the inventor of the present invention based on years of experience in the related industry to conduct extensive researches and experiments, and finally invented a socket with power supply in accordance with the present invention.

The primary objective of the present invention is to provide a socket with power supply that can provides direct current to electronic devices and alternate current to electric devices, respectively.

Another objective of the present invention is to provide a socket with power supply disposed with a cord reel to neatly organize power cords.

The present invention discloses a socket with power supply, comprising a housing having a upper cover and a lower cover which are connected together to form a receiving space and having at least a socket aperture, a first opening, and a second opening thereon; a transformer accommodated in the receiving space and connected with an alternate current source through a plug protruding out of the first opening; at least a socket accommodated in the receiving space, coupled with the alternate current source, able to protrude out of the socket aperture, and capable of outputting the alternate current; a rectifying circuit coupled with the transformer and capable of rectifying the alternate current to direct current; and an output power plug coupled with the rectifying circuit and protruding out of the second opening through a power cord to output the direct current to an electronic device.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

FIG. 4(*b*) schematically illustrates the backside of a cord reel of the present invention.

DETAILED DESCRIPTION OF THE PREFERRED EMBODIMENTS

Figure 1:
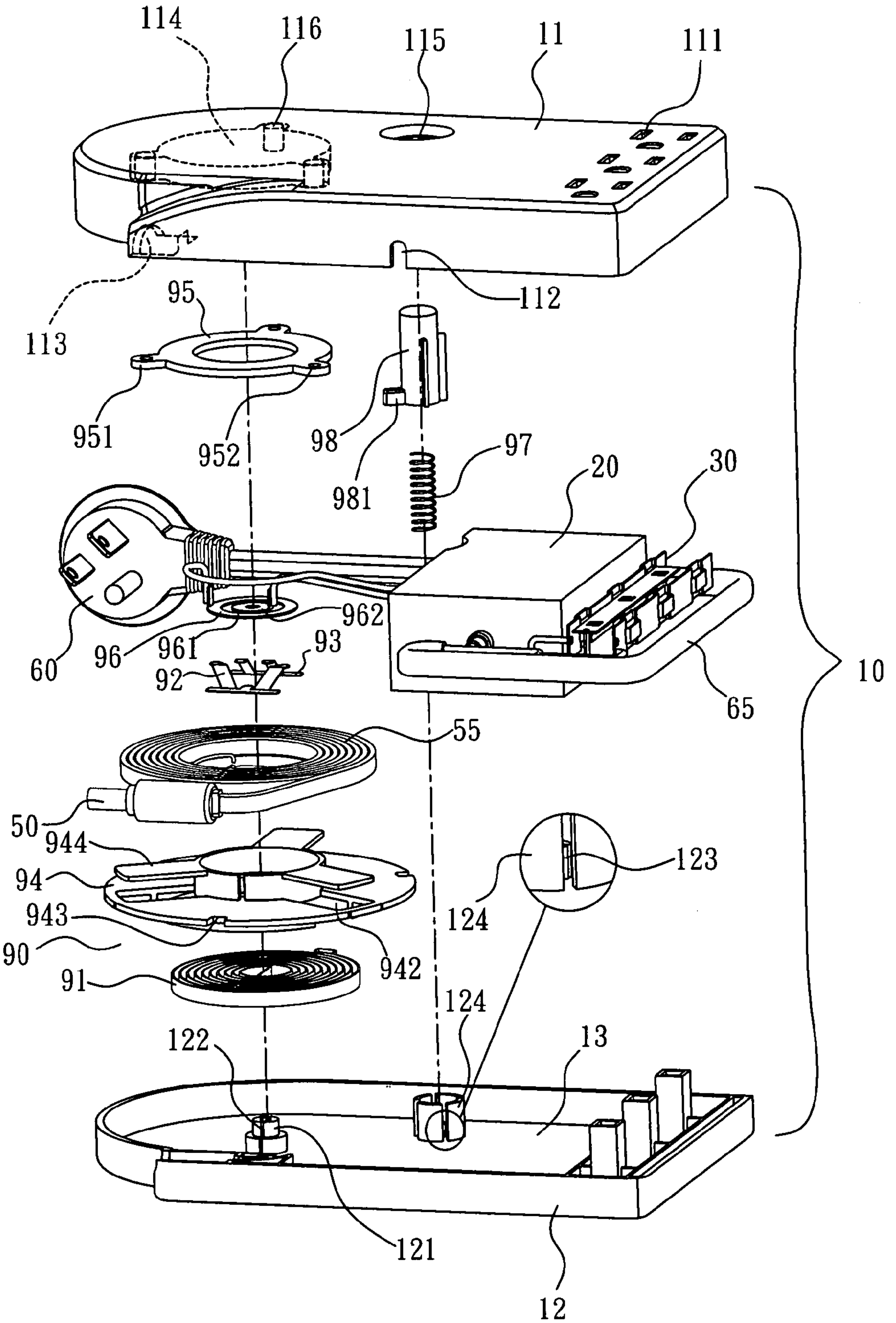
FIG. 1 schematically illustrates an exploded perspective view of a socket with power supply of the present invention.
Figure 2:
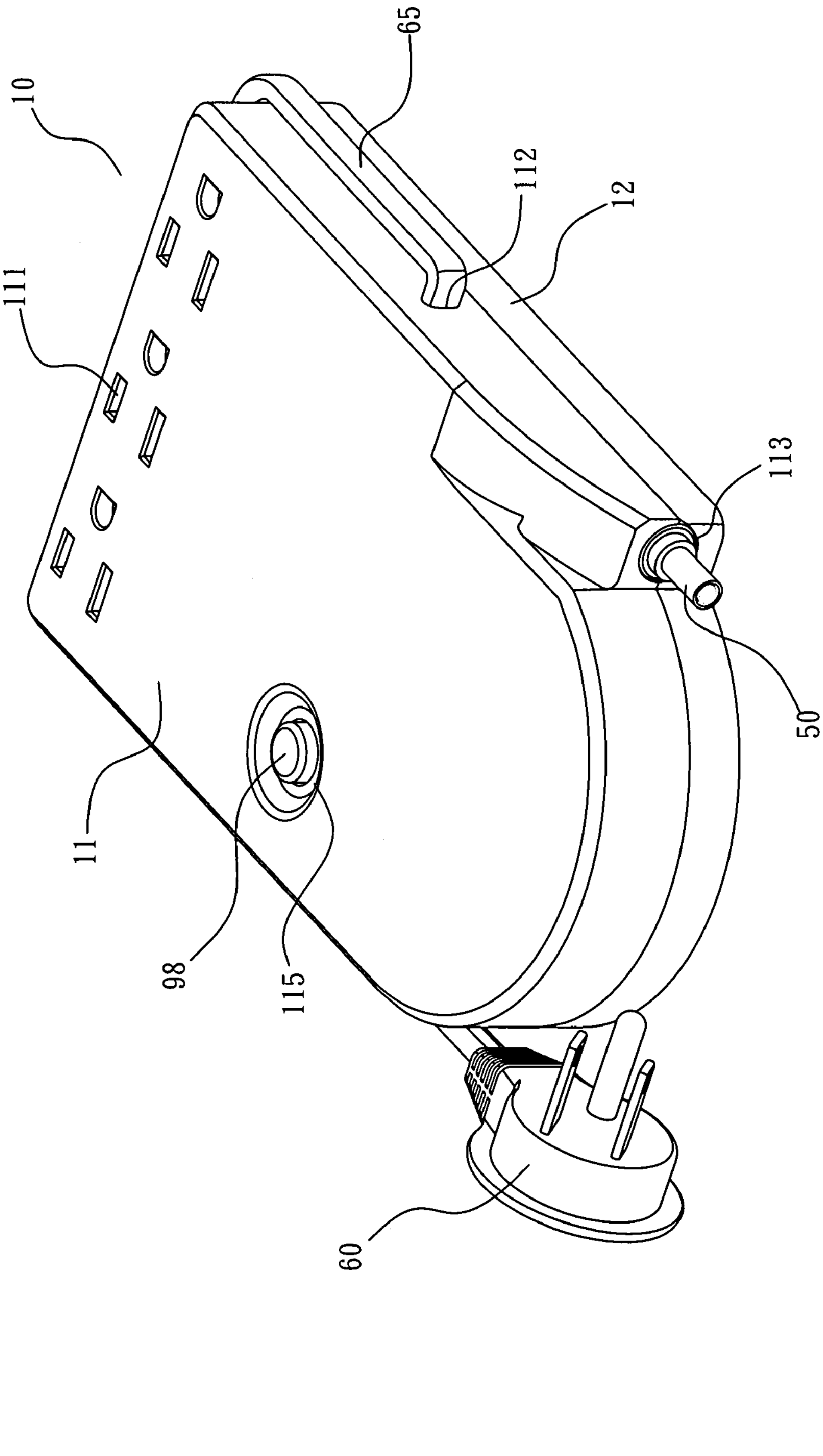
FIG. 2 schematically illustrates a perspective assembly view of a socket with power supply of the present invention.
Figure 3:
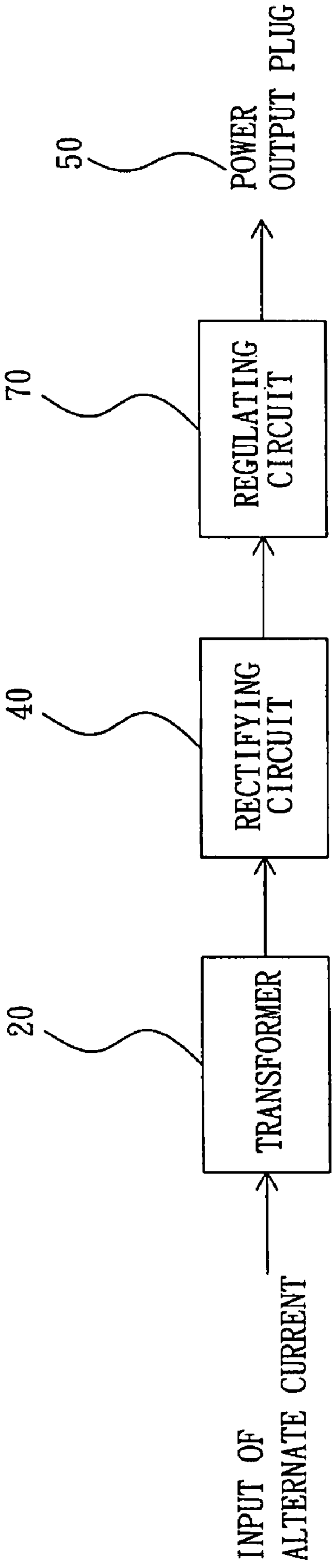
FIG. 3 illustrates a block diagram of a socket with power supply according to one preferred embodiment of the present invention.

The structure, technical measures and effects of the present invention will now be described in more detail hereinafter with reference to the accompanying drawings that show various embodiments of the invention.

With reference to FIGS. 1 to 5, a socket with power supply according to the present invention comprises a housing 10, a transformer 20, at least a socket 30, a rectifying circuit 40, and an output power plug 50. The housing 10 comprises a upper cover 11 and a lower cover 12, wherein the upper cover 11 and the lower cover 12 may be connected together to form a receiving space 13 and the upper cover 11 has at least a socket aperture 111, a first opening 112, a second opening 113, a third opening 114, and a fourth opening 115. The external shape of the housing 10 is, for example but not limited to, square, circular, mixed of the two, or others. In the present embodiment, square and circular shapes are taken for the purpose of explanation, but it is not limited to these shapes. Further, the number of socket aperture 111 may be increased or decreased according to actual demand, which is conventional art and will not be discussed hereafter.

Moreover, the third opening 114 of the upper cover 11 is further disposed at its circumference with three equidistant locating rods 116. The lower cover 12 is further disposed with a rotating axle 121, which corresponds roughly to the center of the third opening 114, fixed slots 122 formed at both sides of the rotating axle 121, and on one side of the rotating axle 121, at least a protruding rod 123, which is with a spring slot 124 therearound.

The transformer 20 is accommodated in the receiving space 13 and can be connected with an alternate current source (not shown) through a plug 60 protruding out of the first opening 112, wherein the alternate current source is, for example but not limited, 110V or 220V, which is conventional art and will not be discussed hereafter. Also, the plug 60 and the transformer 20 may be further disposed with a power cord 65.

The socket 30 is accommodated in the receiving space 13, is coupled with the alternate current source, and may protrudes out of the socket aperture 111 to provide the alternate current to electric devices (not shown).

The rectifying circuit 40 is coupled with the transformer 20 and transforms the alternate current into direct current, and is, for example but not limited to, a half-wave rectifying circuit or full-wave rectifying circuit. The direct current generated by the transformer 20 may provide power for an electronic device (not shown), which is, for example but not limited to, a notebook computer, personal digital assistant (PDA), or portable audio-video player, and so on.

The output power plug 50 is coupled with the rectifying circuit 40, protrudes out of the second opening 113, and outputs the direct current to the electronic device, which is conventional art and will not be discussed hereafter. Also, the rectifying circuit 40 and the output power plug 50 may be further disposed with a power cord 55.

Further, a socket with power supply of the present invention is further disposed with a regulating circuit 70, which is coupled with the output end of the rectifying circuit 40 to stabilize the direct current output.

Furthermore, a socket with power supply of the present invention is further disposed with a printed circuit board (not shown), which is accommodated in the receiving space 13 to hold the transformer 20, the socket 30, the rectifying circuit 40, and the regulating circuit 70, and which is conventional art and will not be discussed hereafter.

Furthermore, a socket with power supply of the present invention is further disposed with a cord reel 90, which is accommodated in the receiving space 13, to draw the power cord 55 into the receiving space 13.

Figure 4A:
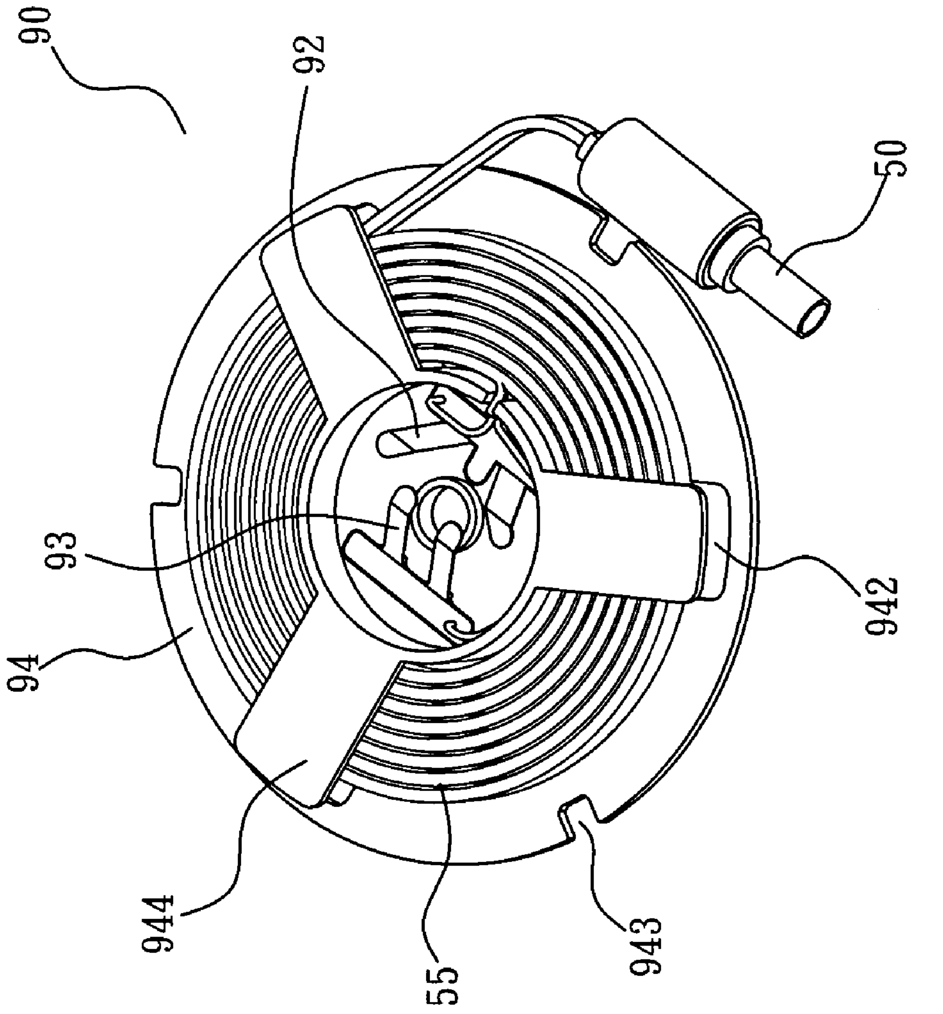
FIG. 4(*a*) schematically illustrates a cord reel further provided in the present invention.
Figure 4B:
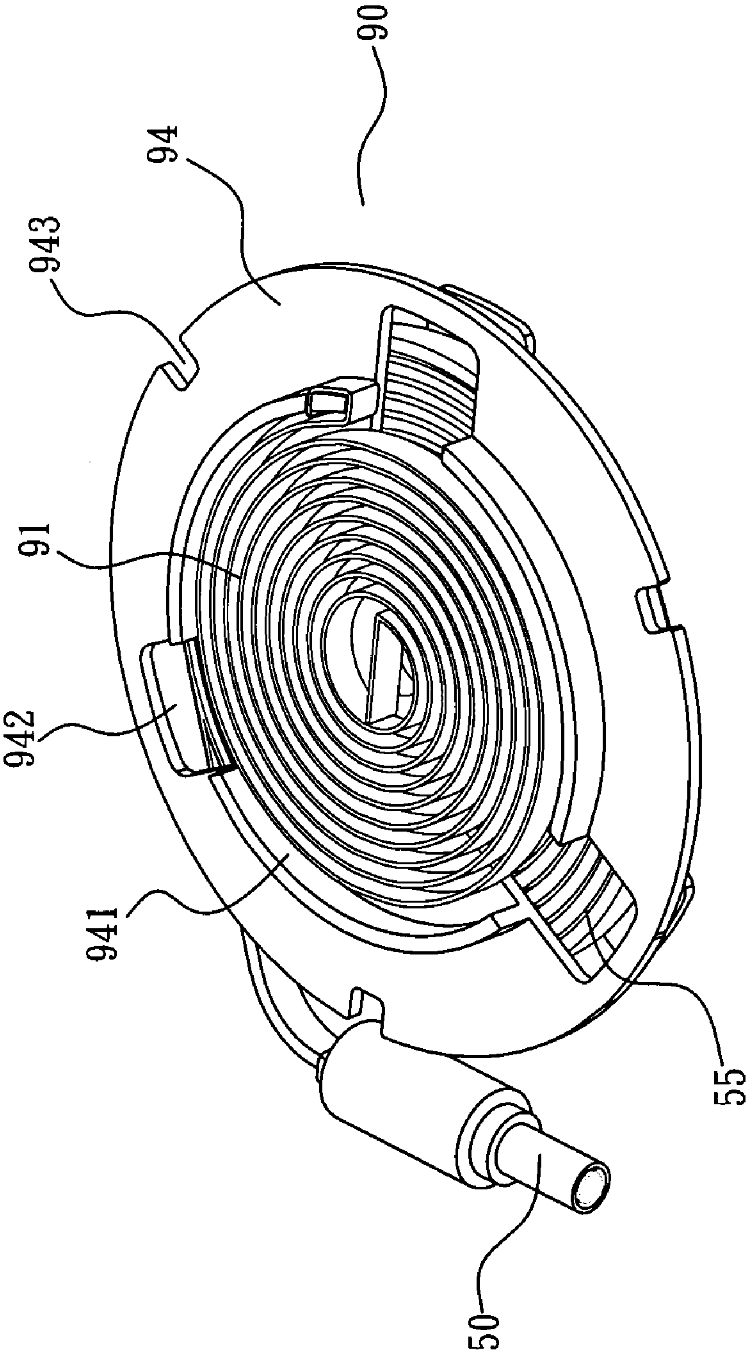
Figure 5:
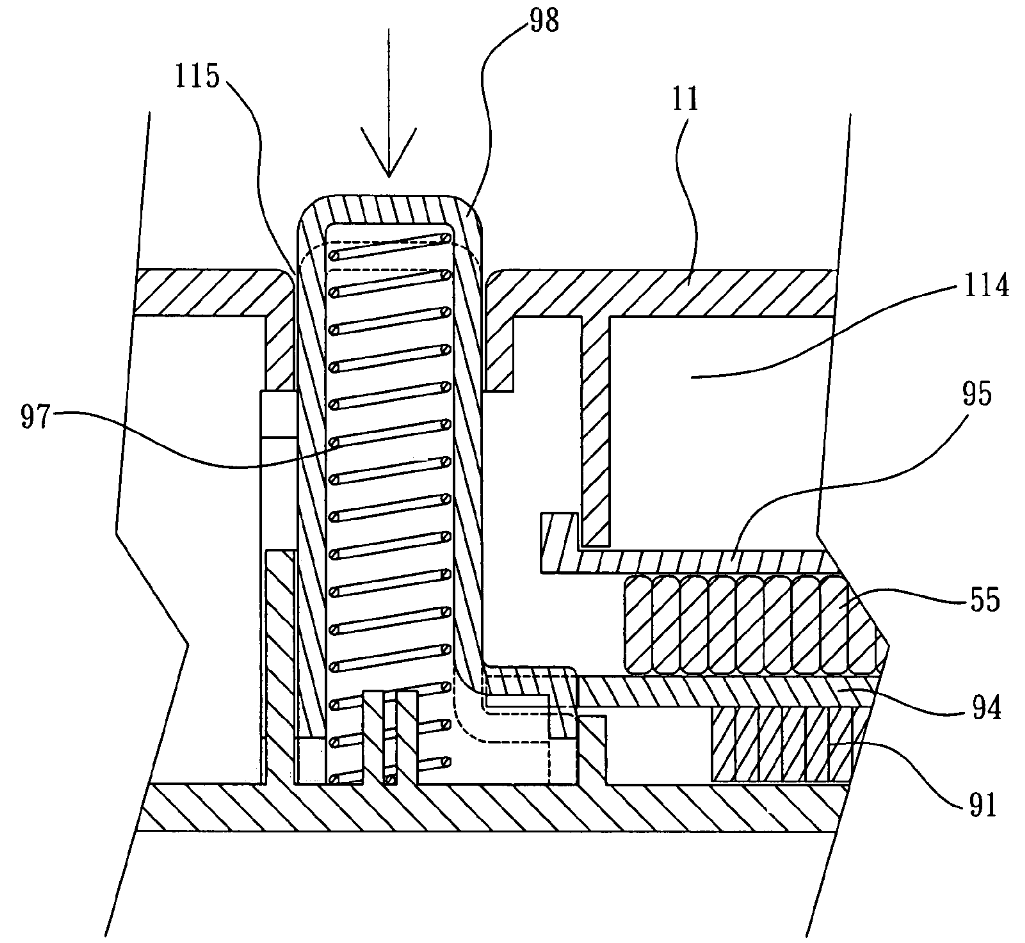
FIG. 5 schematically illustrates a closed-up view of a cord reel of the present invention.

With reference to FIGS. 4 and 5, the cord reel 90 is further disposed with a spiral spring 91, two disc springs 92 and 93, a rotating disc 94, a fixed copper ring 95, a copper ring 96, a compression spring 97, and a rotating disc control key 98. The spiral spring 91 is disposed on the lower cover 12 with its two ends secured onto the fixed slots 122 on both sides of the rotating axle 121, and the power cord 55 is reeled into the backside of the spiral spring 91.

The two disc springs 92 and 93 are coupled with the positive and negative power sources of the power cord 55, respectively.

The rotating disc 94 accommodated in the receiving space 13 has an empty hole 941 to receive the spiral spring 91, and is disposed with three equidistant locating holes 942 and three equidistant engage slots 943 on its circumference for locating and securing the locating rods 116. The interiors of the locating holes 942 are upwardly disposed with a protruding fixed plate 944, respectively.

The fixed copper ring 95 is secured onto the upper cover 11 and at its exterior, is disposed with three equidistant protruding ears 951, which are formed at their centers to have a circular hole 952, respectively, aligned with the corresponding locating rod 116.

The copper ring 96 is secured onto the fixed copper ring 95 and disposed with an external connection point 961 and an internal connection point 962 to contact with the disc springs 92 and 93, respectively, so as to conduct the current output from the transformer 20.

The compression spring 97 is installed onto the protruding rod 123 and positioned in the spring slot 124. The rotating disc control key 98 protrudes out of the fourth opening 115 and accommodates the compression spring 97 and a protruding tip 981 is formed by extending from the one side of the bottom of the rotating disc control key 98.

When the present invention is being implemented, the rotating disc control key 98 is pushed upward with the force exerted by the compression spring 97 and the protruding tip 981 of the rotating disc control key 98 is engaged with the engage slot 943 of the rotating disc 94, such that the power cord 55 will not reel back automatically when being pulled out. When the rotating disc control key 98 is pressed down, the protruding tip 981 of the rotating disc control key 98 moves away from the engage slot 943 of the rotating disc 94, such that the restoring force exerted by the spiral spring 91 reels back the power cord 55 automatically.

Consequently, with implementation of a socket with power supply according to the present invention, it is capable to output direct current to provide electronic devices and alternate current to provide common electric devices and a cord reel further disposed at the present invention can draw power cord into a receiving space. The novel design can indeed overcome the drawbacks of the conventional art.

The present invention provides a feasible solution, and a patent application is duly filed accordingly. However, it is to be noted that the preferred embodiments disclosed in the specification and the accompanying drawings are not intended to limit the invention. To the contrary, it is intended to cover various modifications and similar arrangements and procedures, and thus the scope of the appended claims should be accorded the broadest interpretation so as to encompass all such modifications and similar arrangements and procedures.

What is claimed is:

1. A socket with power supply, comprising:

a housing having a upper cover and a lower cover which are connected together to form a receiving space, and having at least a socket aperture, a first opening, and a second opening thereon;

a transformer accommodated in the receiving space and connected with an alternate current source through a plug protruding out of the first opening;

at least a socket accommodated in the receiving space, coupled with the alternate current source, able to protrude out of the socket aperture, and capable of outputting the alternate current;

a rectifying circuit coupled with the transformer and capable of rectifying the alternate current to direct current; and an output power plug coupled with the rectifying circuit and protruding out of the second opening through a power cord to output the direct current to an electronic device; and a cord reel, which is accommodated in the receiving space, to draw the power cord into the receiving space;

wherein the upper cover is further disposed with a third opening and a fourth opening, and the third opening is further disposed at its circumference with three equidistant locating rods, and the lower cover is further disposed with a rotating axle, which corresponds roughly to the center of the third opening, securing slots formed at both sides of the rotating axle, and, on one side of the rotating axle, at least a protruding rod, which is with a spring slot therearound;

wherein the cord reel further comprises:

a spiral spring disposed on the lower cover with its two ends secured onto the fixed slots on both sides of the rotating axle;

two disc springs coupled with the positive and negative power sources of the power cord, respectively;

a rotating disc which is accommodated in the receiving space having an empty hole to receive the spiral spring, three equidistant locating holes and three equidistant engage slots disposed on the empty hole's circumference for locating and securing the locating rods, and the interiors of the locating holes upwardly disposed with a protruding fixed plate, respectively;

a fixed copper ring secured onto the upper cover and at its exterior, disposed with three equidistant protruding ears, which are further formed at their centers to have a circular hole, respectively, aligned with its corresponding locating rod;

a copper ring secured onto the fixed copper ring and disposed with an external connection point and an internal connection point to contact with the disc springs, respectively, so as to conduct the current output from the transformer;

a compression spring installed onto the protruding rod and positioned in the spring slot; and a rotating disc control key protruding out of the fourth opening and accommodating the compression spring with a protruding tip formed by extending from one side of the bottom of the rotating disc control key;

wherein, when the rotating disc control key is pushed upward with the force exerted by the compression spring to engage the protruding tip of the rotating disc control key with the engage slot of the rotating disc, the power cord will not reel back automatically when being pulled out, and wherein, when the rotating disc control key is pressed down, the protruding tip of the rotating disc control key moves away from the engage slot of the rotating disc, the restoring force exerted by the spiral spring reels back the power cord automatically.

2. The socket with power supply as claimed in claim 1, further comprising a printed circuit board accommodated in the receiving space to hold the transformer, the socket, and the rectifying circuit, wherein the socket aperture may be located on the upper cover.

3. The socket with power supply as claimed in claim 1, further comprising a regulating circuit, which is coupled with the output end of the rectifying circuit to stabilize the direct current output, wherein the rectifying circuit may a half-wave rectifying circuit or a full-wave rectifying circuit.

4. A socket with power supply, comprising:

a housing having a upper cover and a lower cover which are connected together to form a receiving space, and having at least a socket aperture, a first opening, and a second opening thereon;

a transformer to direct current connected with an alternate current source through a plug protruding out of the first opening;

a rectifying circuit coupled with the transformer and capable of rectifying the alternate current to direct current;

an output power plug coupled with the rectifying circuit and protruding out of the second opening through a power cord to output the direct current to an electronic device; and a cord reel accommodated in the receiving space to draw the power cord into the receiving space;

wherein the upper cover is further disposed with a third opening and a fourth opening, and the third opening is further disposed at its circumference with three equidistant locating rods, and the lower cover is further disposed with a rotating axle, which corresponds roughly to the center of the third opening, securing slots formed at both sides of the rotating axle, and, on one side of the rotating axle, at least a protruding rod, which is with a spring slot therearound wherein the cord reel further comprises:

a spiral spring disposed on the lower cover with its two ends secured onto the fixed slots on both sides of the rotating axle;

two disc springs coupled with the positive and negative power sources of the power cord, respectively;

a rotating disc which is accommodated in the receiving space having an empty hole to receive the spiral spring, three equidistant locating holes and three equidistant engage slots disposed on the empty hole's circumference for locating and securing the locating rods, and the interiors of the locating holes upwardly disposed with a protruding fixed plate, respectively;

a fixed copper ring secured onto the upper cover and at its exterior, disposed with three equidistant protruding ears, which are further formed at their centers to have a circular hole, respectively, aligned with its corresponding locating rod;

a copper ring secured onto the fixed copper ring and disposed with an external connection point and an internal connection point to contact with the disc springs, respectively, so as to conduct the current output from the transformer;

a compression spring installed onto the protruding rod and positioned in the spring slot; and a rotating disc control key protruding out of the fourth opening and accommodating the compression spring with a protruding tip formed by extending from one side of the bottom of the rotating disc control key;

wherein, when the rotating disc control key is pushed upward with the force exerted by the compression spring to engage the protruding tip of the rotating disc control key with the engage slot of the rotating disc, the power cord will not reel back automatically when being pulled out, and wherein, when the rotating disc control key is pressed down, the protruding tip of the rotating disc control key moves away from the engage slot of the rotating disc, the restoring force exerted by the spiral spring reels back the power cord automatically.

5. The socket with power supply as claimed in claim 4, further comprising a printed circuit board accommodated in the receiving space to hold the transformer, the socket, and the rectifying circuit.

6. The socket with power supply as claimed in claim 4, further comprising a regulating circuit, which is coupled with the output end of the rectifying circuit to stabilize the direct current output, wherein the rectifying circuit may a half-wave rectifying circuit or a full-wave rectifying circuit.

7. The socket with power supply as claimed in claim 4, wherein the upper cover is disposed with at least a socket aperture and the receiving space is disposed with at least a socket protruding out of the socket aperture to couple with the alternate current source and output the alternate current.

* * * * *